United States Patent
Cooper et al.

(10) Patent No.: US 9,673,685 B2
(45) Date of Patent: Jun. 6, 2017

(54) SYSTEM AND METHOD FOR DETECTION OF MOTOR VIBRATION

(71) Applicant: Rockwell Automation Technologies, Inc., Mayfield Heights, OH (US)

(72) Inventors: Mark Cooper, Eden Prairie, MN (US); Kelly J. Bronk, Kewaskum, WI (US); Wei Qian, Shanghai (CN); Zhenhuan Yuan, Shanghai (CN); Shankernarayan Ramanarayanan, Eden Prairie, MN (US); Manas Sawant, Madison, WI (US); Shun Feng, Edina, MN (US); Robert H. Schmidt, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 169 days.

(21) Appl. No.: 14/243,353

(22) Filed: Apr. 2, 2014

(65) Prior Publication Data
US 2015/0288257 A1   Oct. 8, 2015

(51) Int. Cl.
| | |
|---|---|
| *G05B 5/00* | (2006.01) |
| *H02H 5/00* | (2006.01) |
| *H02P 7/08* | (2006.01) |
| *H02K 11/00* | (2016.01) |
| *G01M 1/14* | (2006.01) |
| *H02P 21/14* | (2016.01) |

(Continued)

(52) U.S. Cl.
CPC ............ *H02K 11/001* (2013.01); *G01M 1/14* (2013.01); *H02K 11/20* (2016.01); *H02P 21/14* (2013.01); *H02K 5/24* (2013.01)

(58) Field of Classification Search
CPC ......... H02K 11/001; G01M 1/14; H02P 21/14
USPC ........................................... 318/460
See application file for complete search history.

(56) References Cited

U.S. PATENT DOCUMENTS

| | | | |
|---|---|---|---|
| 4,887,032 A | 12/1989 | Hetrick | |
| 6,053,047 A | 4/2000 | Dister et al. | |

(Continued)

FOREIGN PATENT DOCUMENTS

| | | |
|---|---|---|
| EP | 1696070 A1 | 8/2006 |
| GB | 2466472 A | 6/2010 |

OTHER PUBLICATIONS

Extended European Search Report dated May 16, 2013, European Patent Application No. 15161868.3—(11) pages.

*Primary Examiner* — Erick Glass
(74) *Attorney, Agent, or Firm* — Boyle Frederickson, SC (57) ABSTRACT

An improved system for monitoring vibration of an electric machine is disclosed. According to one embodiment, sensors are positioned in a plane orthogonal to the motor shaft and each sensor detects vibration along at least one axis of the motor. The sensors are oriented such that the polarity of each sensor is reversed. The pairs of sensors may be used to isolate specific vibrations within the motor. According to another embodiment, a sensor may be mounted directly to the motor shaft. The sensor on the motor shaft directly detects vibrations along the motor shaft. Optionally, a second sensor may be mounted to a fixed location within the motor housing, and the combination of the sensor on the motor shaft and the sensor at a fixed location may be used to isolate specific vibrations within the motor. A motor controller may adjust operation of the motor to reduce the isolated vibration.

17 Claims, 3 Drawing Sheets

(51) Int. Cl.
*H02K 11/20* (2016.01)
*H02K 5/24* (2006.01)

(56) References Cited

U.S. PATENT DOCUMENTS

| | | | |
|---|---|---|---|
| 6,138,078 | A | 10/2000 | Canada et al. |
| 7,821,220 | B2 | 10/2010 | El-Ibiary |
| 8,531,147 | B2 | 9/2013 | Chamberlin et al. |
| 2006/0192508 | A1 | 8/2006 | Albers |
| 2007/0071057 | A1* | 3/2007 | Ohta .................. G01H 1/003 372/58 |
| 2010/0191484 | A1* | 7/2010 | Schoonover ............ G01P 15/00 702/56 |
| 2012/0074473 | A1* | 3/2012 | Lee .................. H01L 27/10823 257/288 |
| 2012/0181965 | A1 | 7/2012 | Chamberlin et al. |
| 2014/0042876 | A1 | 2/2014 | Brockerhoff et al. |
| 2014/0104725 | A1* | 4/2014 | Massarotti ............ G11B 5/5582 360/97.19 |

* cited by examiner

SYSTEM AND METHOD FOR DETECTION OF MOTOR VIBRATION

BACKGROUND OF THE INVENTION

The subject matter disclosed herein relates generally to control of an electric motor and, more specifically, to a system for detecting vibrations using sensors mounted to the electric motor and reducing the detected vibrations using a controller connected to the electric motor.

Electrical rotating machines, such as electric motors or generators, have become widespread and are found in numerous applications and configurations. Electric machines include a stationary component (i.e., the stator) and a rotating component (i.e., the rotor). In electric motors, a magnetic field is established in the rotor, for example via magnets mounted to the rotor or via an electrical current applied to or induced in a coil wound on the rotor. A second, rotating magnetic field is established as a result of the application of a controlled voltage to the stator, and the rotation of the magnetic field in the stator causes the magnetic field in the rotor to rotate, thereby causing rotation of the rotor. A shaft or other drive member is mounted to the rotor and extends outside the rotor housing providing a mechanical coupling to a device, such as a gearbox, pump, or fan that is to be driven as the rotor rotates.

It is also known that motor controllers may be provided to convert input power, from either an alternating current (AC) source or a direct current (DC) source, to the controlled voltage applied to the stator. In certain applications, high performance of the motor and the controlled machine is desired. For example, a servo motor may position a machine tool with high speed and tight position tolerances for repeatable manufacturing of components. The servo motors may be mounted to a machine and coupled, via a gearbox to a drive member, such as ball-screw or rack and pinion used to position one axis of the machine.

Due to the rotational nature of an electric machine, imbalances, for example, on the rotor shaft; misalignments, for example, between the motor shaft and the gearbox; complaint mechanical loads, such as couplings between a motor shaft and a gearbox; or even torque ripple due to machine construction, can result in vibrations or resonance being generated within the control system. These vibrations or resonances may not occur throughout the operating range of the motor but may occur at specific operating frequencies. Such vibrations or resonances may result in increased wear on the motor or require the responsiveness, of the motor controller to be reduced to avoid the resonance, resulting in reduced throughput of the controlled machine. Thus, it would be desirable to detect such vibration to provide improved operation of the controlled machine.

Historically, sensors have been mounted to the motor to detect vibrations in the motor. A motor controller may receive a signal corresponding to the vibration and adjust an operating parameter in the motor controller in response to the vibration signal. However, multiple potential sources of vibration exist in a motor, and each source of vibration may require different adjustments to the control of the motor to reduce the level of vibration. With existing vibration detection sensing systems, it is difficult or impossible to determine the source of the vibration. Thus, it would be desirable to provide an improved system for monitoring vibration of an electric machine and for adjusting operation of the motor to reduce vibration detected in the motor.

BRIEF DESCRIPTION OF THE INVENTION

The subject matter disclosed herein describes an improved system for monitoring vibration of an electric machine and for adjusting operation of the motor to reduce vibration detected in the motor. Sensors are positioned within the motor housing to detect vibrations of the electric machine. According to one embodiment, each sensor is positioned in a plane orthogonal to the motor shaft. A first sensor is mounted on one side of the motor shall and a second sensor is mounted on the opposite side of the motor shaft. Each sensor detects vibration along at least one axis of the motor and the sensors are oriented such that the polarity of each sensor is reversed. In other words, a signal from a first sensor corresponding to vibration in one direction along one of the axes has a positive magnitude while a signal from a second sensor corresponding to vibration in the same direction along the same axis has a negative magnitude. The pairs of sensors may be used to identify specific vibrations within the motor and allow the motor controller to adjust operation of the motor to reduce or eliminate the identified vibration. According to another embodiment, a sensor may be mounted directly to the motor shaft. The sensor on the motor shaft may directly detect vibrations along the motor shaft. Optionally, a second sensor may be mounted to a fixed location within the motor housing, and the combination of the sensor on the motor shaft and the sensor at a fixed location may be used to isolate specific vibrations within the motor and allow the motor controller to adjust operation of the motor to reduce or eliminate the isolated vibration.

According to one embodiment of the invention, an electric machine configured to be operated by a controller includes a housing, a stator, and a rotor. The stator is mounted within the housing and configured to receive a voltage from the controller to control operation of the electric machine. The rotor is rotatably mounted within the housing and rotates about a central axis as a function of the voltage applied to the stator. The electric machine also includes at least one sensor mounted at a position within the housing proximate to the rotor. Each sensor is configured to generate a signal corresponding to a vibration detected at the position the sensor is mounted. Each position of the sensor is located in a plane orthogonal to the central axis, each signal is transmitted to the controller, and the controller adjusts operation of the electric machine as a function of the signals corresponding to the vibration detected.

According to another embodiment of the invention, an electric machine configured to be operated by a controller includes a housing, a stator mounted within the housing, a rotor rotatably mounted within the housing, and a shaft connected to the rotor and extending outside the housing. The stator is configured to receive a voltage from the controller to control operation of the electric machine, and the rotor rotates as a function of the voltage applied to the stator. The shaft has a central axis about which it rotates. A first sensor is mounted at a first position within the housing proximate to the shaft and configured to generate a signal corresponding to a vibration detected at the first position, and a second sensor is mounted at a second position within the housing proximate to the shaft and configured to generate a signal corresponding to a vibration detected at the second position. The first position and the second position are located in a plane orthogonal to the central axis of the shaft, and the signals corresponding to the vibration detected at the first and second positions are transmitted to the controller. The controller adjusts operation of the electric machine as a function of the signals corresponding to the vibration detected at the first and second positions.

According to yet another embodiment of the invention, a method of controlling operation of an electric machine is disclosed. A voltage is generated with a controller and provided to a stator of the electric machine, which, in turn, causes rotation of a rotor of the electric machine. A vibration present at a first position within the electric machine is detected with a first sensor mounted at the first position, and a vibration present at a second position within the electric machine is detected with a second sensor mounted at the second position. The signals corresponding to the vibration present at the first position from the first sensor and to the vibration present at the second position from the second sensor are transmitted to the controller. The first position and the second position are located in a plane orthogonal to a shaft of the electric machine, where the shaft is connected to the rotor. Operation of the electric machine is adjusted with the controller as a function of the signals corresponding to the vibration present at the first and second positions.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 1:
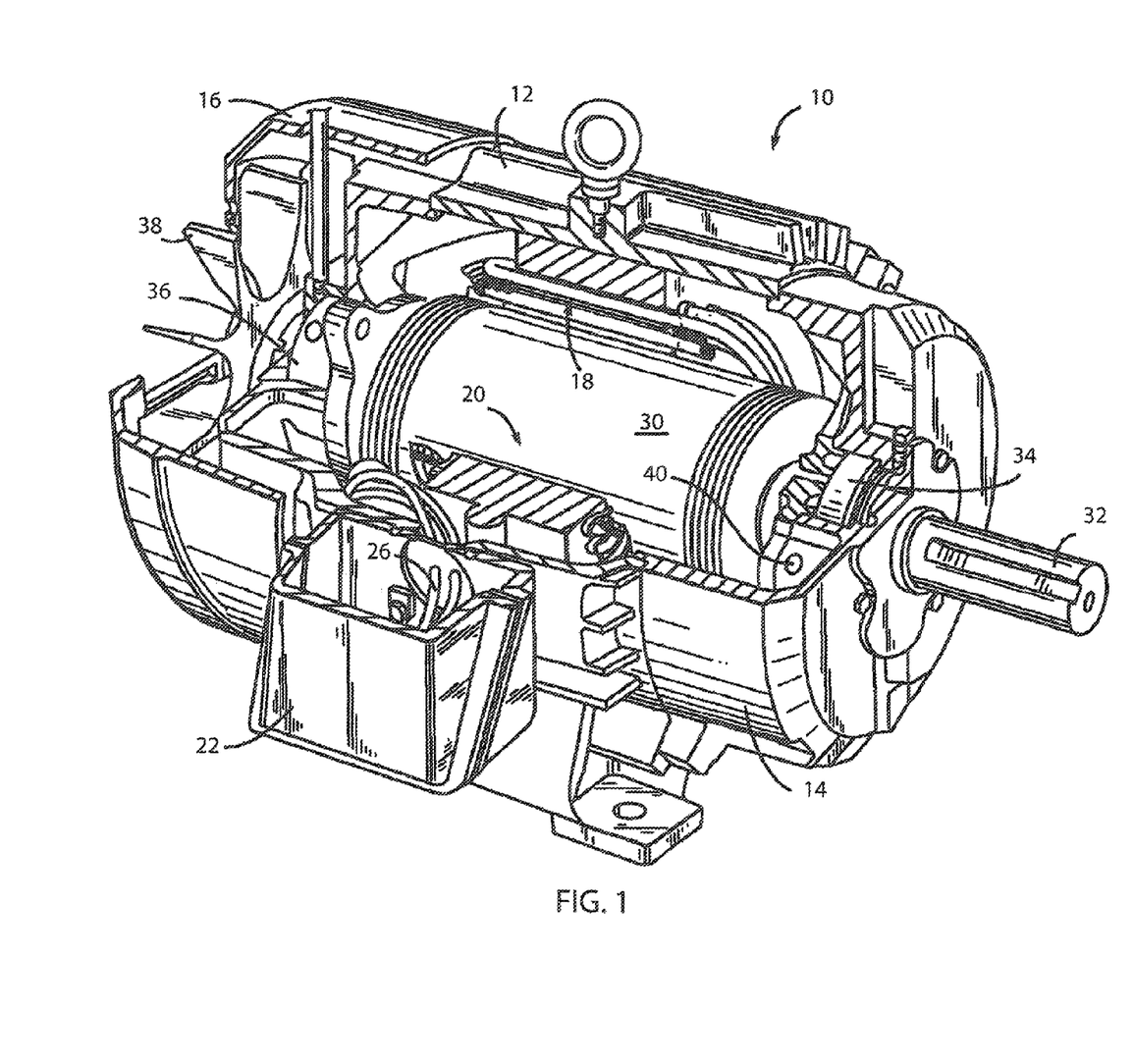
FIG. 1 is a perspective view of a motor with a portion of the housing cutaway to illustrate a portion of the internal components of the motor according to one embodiment of the invention.
Figure 2:
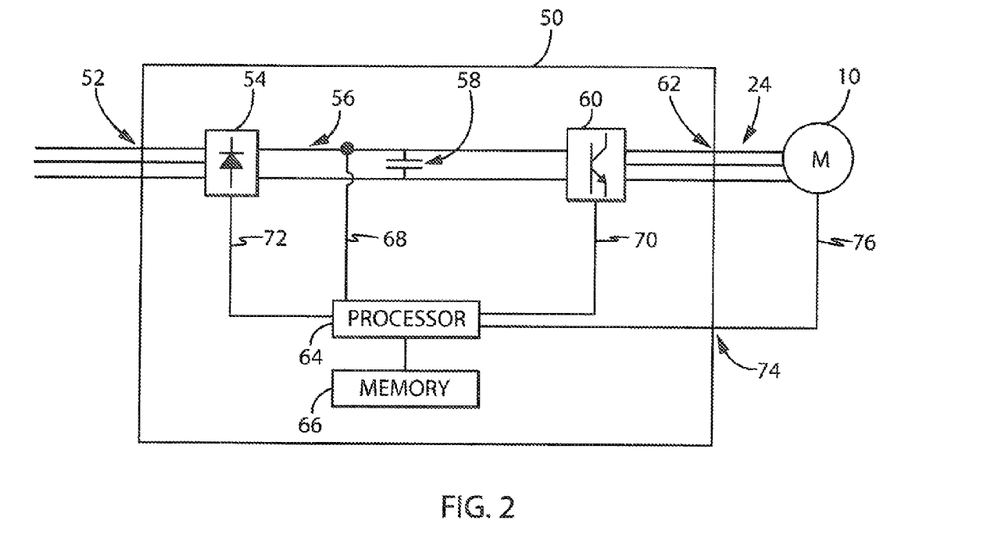
FIG. 2 is a block diagram representation of a motor controller connected between a power supply and a motor according to one embodiment of the invention.

Turning initially to FIG. 1, an exemplary motor 10 incorporating a system to mitigate vibration of the motor 10 according to one embodiment of the invention is illustrated. The motor 10 includes a frame 12 open at each end. A front end cap 14 and a rear end cap 16 enclose each end and, in combination with the frame 12, define a housing for the motor 10. The motor 10 includes a stator assembly 18, configured to receive a voltage to control operation of the motor 10, and a rotor assembly 20 configured to rotate as a function of the voltage applied to the stator assembly 18. A junction box 22 is mounted to the frame 12 and is configured to receive motor leads 24 from a motor controller 50 (as shown in FIG. 2) which are, in turn, connected to leads 26 from the stator assembly 18 within the junction box 22, establishing an electrical connection between the stator assembly 18 and the motor controller 50.

The rotor assembly 20 includes a rotor 30 and a motor shaft 32. The motor shaft 32 may extend all the way through the rotor 30 or, optionally, a first portion of the shaft may extend from the front of the rotor assembly 20 and a second portion may extend from the rear of the rotor assembly 20. The shaft 32 extends through an opening in the front end cap 14 for mechanical coupling to a driven machine. The rotor assembly 20 is supported for rotation within the housing by a front bearing set 34 and a rear bearing set 36, located within the front end cap 14 and the rear end cap 16, respectively. In the illustrated embodiment, a cooling fan 38 draws air in through the openings in the rear end cap 16 which passes over and cools both the stator assembly 18 and the rotor assembly 20. The rotor assembly 20 may include magnets mounted on the surface or embedded within the rotor 30 to generate a magnetic field. Optionally, the rotor 30 may include a coil or a set of coils configured to receive a voltage, for example, via slip rings mounted to the rotor assembly 20 or via induction from the voltage applied to the stator assembly 18. It is contemplated that the vibration mitigation system disclosed herein may be utilized with still other configurations and arrangements of the motor 10 without deviating from the scope of the invention.

Control of the motor 10 may be accomplished with a motor controller 50. Referring next to FIG. 2, a motor controller 50 according to one embodiment of the invention includes a power input 52 configured to be connected to a power source. According to the illustrated embodiment, a three-phase alternating current (AC) power source is connected to the power input 52. Optionally, the motor controller 50 may be connected to a single-phase AC power source or to a direct current (DC) power source. A rectifier section 54 converts the three-phase AC power to a DC voltage present on the DC bus 56. The rectifier section 54 may be a passive rectifier, including, for example, diode bridge rectification, or an active rectifier, including, for example, semiconductor switching devices such as insulated gate bipolar transistor (IGBT), metal oxide semiconductor field-effect transistor (MOSFET), silicon controlled rectifier (SCR), thyristor, or any other suitable controlled switching device. The rectifier section 54 may transmit or receive signals 72 with the processor 64 including, but not limited to, feedback signals generated by sensors located in the rectifier section 54 corresponding to a current and/or a voltage present at the input to or output from the rectifier section 54 or switching signals generated by the processor 64 to control switching devices in an active rectifier. The DC bus 56 includes a capacitance 58 connected between a positive rail and a negative rail across which the DC voltage potential is present. It is contemplated that the positive rail and the negative rail may each have a positive voltage potential, a negative voltage potential, or be connected to a common voltage potential. Typically, the positive rail has a greater voltage potential than the negative rail. The processor 64 may also receive signals 68 from a sensor connected to the DC bus including, for example, a signal corresponding to the voltage and/or current present on the positive rail, the negative rail, or between the two rails. An inverter section 60 converts the DC voltage present on the DC bus 56 to an AC voltage having a variable frequency and a variable magnitude. The inverter section 60 includes, for example, semiconductor switching devices such as IGBTs, MOSFETs, SCRs, thyristors, or any other suitable controlled switching device. The inverter section 60 may transmit or receive signals 70 with the processor 64 including, but not limited to, feedback signals generated by sensors located in the inverter section 60 corresponding to a current and/or a voltage present at the input to or output from the inverter section 60 or switching signals generated by the processor 64 to control operation of the switching devices. The motor controller 50 includes a processor 64 configured to execute a series of instructions stored on a memory device 66. The processor 64 may be a single processing device or multiple processing devices executing in parallel. The processor 64 may be a field programmable gate array (FPGA), application specific integrated circuit (ASIC), general purpose microprocessor, dedicated processor, or a combination thereof. The memory device 66 may be a single device or multiple devices and may include volatile memory, non-volatile memory or a combination thereof. The motor controller 50 also includes at least one input 74 configured to receive a feedback signal 76 from the motor 10. The processor 64 receives the feedback signal 76 from the input 74 which may be, but is not limited to an angular position signal, a current signal, a voltage signal, and a signal corresponding to an amplitude of vibration present in the motor 10.

Referring again to FIG. 1, the motor 10 includes at least one sensor 40 mounted within the housing of the motor 10 which is configured to generate a signal corresponding to the vibration present in the motor 10. The sensor 40 is, for example, an accelerometer generating a signal corresponding to the acceleration in one or more axes of the motor 10. According to one embodiment of the invention, illustrated in FIG. 4, the sensor 40 may be mounted on and rotate with the shaft 32 to directly detect vibration on the shaft 32. Optionally, the sensor 40 may also include a portion mounted to a non-rotational location proximate to the shaft 32 and configured to receive the signal corresponding to the acceleration in each axis. The signal may be communicated, for example, from the rotating portion of the sensor 40 via wireless communications or via a slip ring configuration. It is also contemplated that the signal may be communicated directly to another controller, such as the motor controller 50. The motor 10 may also include a second sensor 40 mounted to the non-rotational portion of the motor 10. As illustrated, the second sensor 40 is mounted to the stator assembly 18; however, it could similarly mounted, for example, to an internal surface of the housing or to a bearing set within the motor 10. A signal corresponding to the vibration experienced by the housing of the motor 10 may be generated by the second sensor 40. With signals generated both by the sensor 40 mounted on the shaft 32, or another rotational portion of the motor 10, and the sensor 40 mounted to the non-rotational portion of the motor 10, a controller may differentiate between vibrations experienced generally by the motor 10 from vibrations present only on the motor shaft 32.

Figure 5:
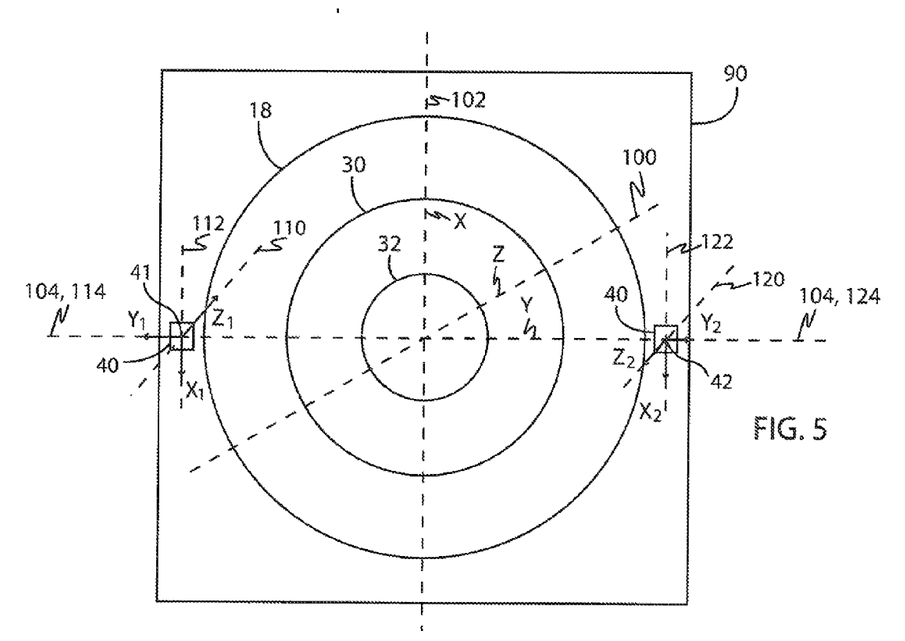
FIG. 5 is a block diagram representation of sensor placement within a motor housing according to another embodiment of the invention.

According to another embodiment of the invention, two sensors 40 may be mounted to non-rotational portions of the motor 10. Referring also to FIG. 5, a first sensor 40 is located at a first position 41 within the motor 10 and a second sensor 40 is located at a second position 42 within the motor 10. The motor 10 is illustrated in block diagram form by a series of concentric circles with the stator assembly 18 as the outermost circle, the rotor 30 as the intermediate circle, and the motor shaft 32 as the innermost circle. According to one embodiment of the invention, both the first and second sensors 40 are mounted on a bearing set 34 by which the rotor 30 is rotatably mounted to the housing. Each of the sensors 40 may be mounted on opposite sides of the shaft 32 or of the portion of the rotor 30 supported by the bearing set 34.

A plane 90 orthogonal to the rotor shaft 32 and axes of each sensor and of the motor are also shown in FIG. 5. A first, central axis 100 defines the axis about which the motor shaft 32 rotates and extends through the motor 10. A second axis 102 is defined as orthogonal to the central axis 100 and extends between a top and a bottom of the motor 10. A third axis 104 is defined, as orthogonal to both the central axis 100 and the second axis 102, extending between the sides of the motor 10. The second axis 102 and the third axis 104 exist within plane 90. Additionally, references to the top, bottom, and/or sides or for illustration only. It is contemplated that the second axis 102 and the third axis 104 may be rotated within the plane 90 orthogonal to the rotor shaft 32 without deviating from the scope of the invention. As illustrated, the central axis 100 is defined as a "Z" axis, the second axis 102 is defined as a "X" axis, and the third axis 104 is defined as a "Y" axis of the motor 10. Each of the sensors 40 similarly has three axes illustrated. The sensor 40 at the first position 41 is shown with a Z axis 110 with a positive magnitude in the Z axis illustrated, $Z_1$, an X axis 112 with a positive magnitude in the X axis illustrated, $X_1$, and a Y axis 114 with a positive magnitude in the Y axis illustrated, $Y_1$. The sensor 40 at the second position 42 is shown with a Z axis 120 with a positive magnitude in the Z axis illustrated, $Z_2$, an X axis 122 with a positive magnitude in the X axis illustrated, $X_2$, and a Y axis 124 with a positive magnitude in the Y axis illustrated, $Y_2$. It is contemplated that each sensor 40 may detect vibration in either fewer or greater number of axes without deviating from the scope of the invention. Similarly, multiple sensors 40, each detecting vibration in a single axis may be used to detect vibration of the motor 10 in multiple axes. A positive magnitude of vibration for each axis of each of the sensors 40 is illustrated by the direction of the vectors, $X_1$, $Y_1$, $Z_1$, $X_2$, $Y_2$, and $Z_2$. Thus, the first sensor 40 and the second sensor 40 are mounted such that a vibration in the motor which generates a signal in the first sensor 40 having a positive magnitude will generate a signal in the second sensor 40 having a negative magnitude.

According to one embodiment of the invention, the two X axes, $X_1$ and $X_2$, are configured to measure vibrational forces tangential to the motor shaft 32 and in opposite directions. The two Y axes, $Y_1$, and $Y_2$, are configured to measure vibrational forces orthogonal to the central axis 100 of the motor shaft 32 surface and directed in opposite directions away from the motor shaft 32. The two Z axes, $Z_1$ and $Z_2$, are configured to measure vibrational forces aligned with but offset from the central axis 100 of the motor shaft 32 and in opposite directions. It is contemplated that each pair of sensors is positioned within the plane 90 orthogonal to the motor shaft 32 and such that each sensor 40 is positioned 180 degrees around the motor shaft 32 from the other sensor 40. Optionally, the sensors 40 may be positioned other than 180 degrees around the motor shaft 32 from each other. However, effectiveness of the vibration compensation may be reduced or additional computation may be required to compensate for the sensor position if the sensors 40 are positioned other than 180 degrees around the motor shaft 32 from each other.

Figure 3:
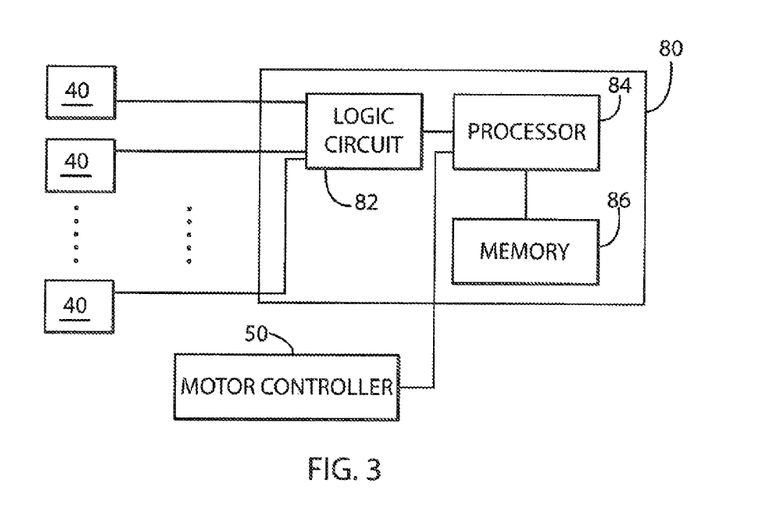
FIG. 3 is a block diagram representation of a controller operatively connected between vibration sensors and a motor controller according to one embodiment of the invention.

It is contemplated that the controller receiving the signals may be the processor 64 in the motor controller 50 or a second controller, such as a programmable logic controller (PLC) or other industrial controller. Referring, for example, to FIG. 3, a controller 80 is connected to multiple vibration sensors 40. The controller 80 includes a logic circuit 82 configured to receive the data signals from the vibration sensors. The logic circuit 82 may include an analog to digital converter to convert the signals to a value suitable for input to a processor 84 on the controller 80. Optionally, the logic circuit 82 may include additional signal processing capabilities and may, for example, perform some initial processing such as adding or subtracting signals corresponding to the same axis of vibration and generated from vibration sensors 40. The controller 80 further includes a memory device 86 in communication with the processor 84. The processor may be further configured to execute instructions stored on the memory device 86 to perform additional processing of the signals and to generate command signals to control operation of the motor controller 50 as a function of the vibration signals. Similarly, the controller 80 may be configured to alter configuration parameters stored within the motor controller 50 to adjust performance of the motor controller 50 as a function of the vibration signals.

In operation, the sensors 40 provide an improved system for detecting and identifying the source of vibration in a motor 10. Motor vibration may be caused by numerous sources including, but not limited to, motor torque ripple, mechanical resonance, improper and/or poorly configured motor control, vibration on the machine chassis, bearing wear, and shaft misalignment. As previously discussed, determining the source and to accurately determine magnitudes of a particular vibration in a motor 10 is a challenge. The location and configuration of the sensors 40 in the motor 10 as disclosed herein, allows the disclosed system to identify the source and to accurately determine the magnitude of a vibration in the motor 10. Thus, a motor controller 50 may adaptively control the motor 10 to avoid a particular operating condition and/or adjust the configuration of the motor controller to reduce the magnitude of the vibration.

According to one embodiment of the invention, a sensor 40 mounted directly to the shaft is configured to detect a reaction torque, $T_r$, on the motor 10. With reference again to FIG. 4, the reaction torque, $T_r$, is a torque applied to the motor 10 by a load and may be generated as a result of one or more of the afore-mentioned sources of vibration, such as mechanical resonance and shaft misalignment. The sensor 40 mounted to the shaft 32 detects a force, $F_m$, tangential to the shaft 32. A signal corresponding to this force is transmitted to a controller 80 which may be used to determine the total torque at the sensor 40. The total torque is a function of both reaction torque, $T_r$, and the electromagnetic torque, $T_e$, applied to the motor 10 via the motor controller 50. A signal corresponding to the commanded electromagnetic torque, $T_e^*$, may be sent from the motor controller 50 to the controller 80. The controller 80 determines the reaction torque, $T_r$, by subtracting the commanded electromagnetic torque, $T_e^*$, from the total torque as determined from the force measured by the sensor 40 on the motor shaft 32. The above described method determines the reaction torque, $T_r$, without considering other vibrations applied to the housing of the motor 10. Optionally, the vibration signals may be transmitted to the processor 64 in the motor controller 50, and the processor 64 in the motor controller 50 may be used to determine the reaction torque, $T_r$, present on the motor 10.

Figure 4:
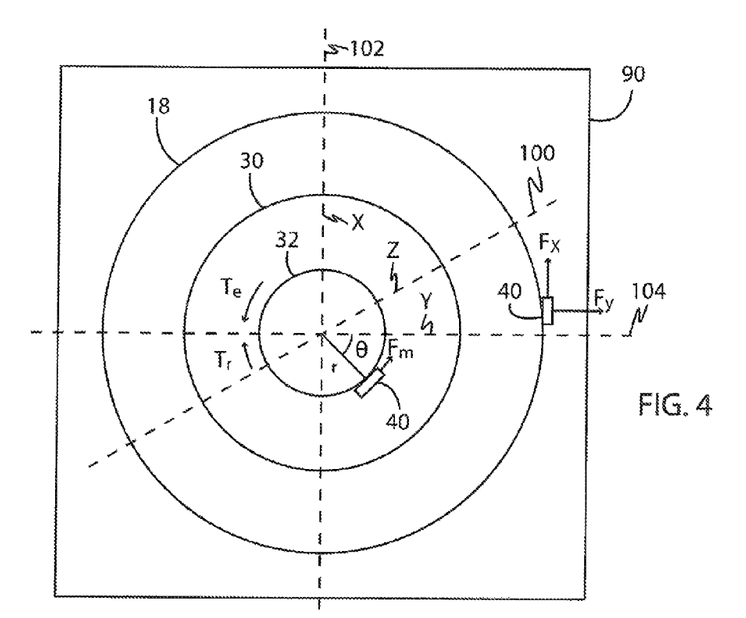
FIG. 4 is a block diagram representation of sensor placement within a motor housing according to one embodiment of the invention.

Should the environmental conditions result in additional vibrations being present on the motor housing, the second sensor 40 mounted to a non-rotational portion of the motor 10 may be provided. The second sensor 40 measures forces, $F_x$ and $F_y$, in the directions of both the X axis 102 and the Y axis 104, respectively. By sampling both the angular position, θ, of the sensor 40 on the motor shaft 32 as well as the forces measured by each sensor 40, a compensated force, $F_m'$, tangential to the shaft 32 may be calculated by the controller 80 according to Equation 1. The compensated force, $F_m'$, may then be used rather than the measured force, $F_m$, along with the commanded electromagnetic torque, $T_e^*$, as discussed above, to determine the reaction torque, $T_r$, present on the motor 10. Thus, the reaction torque, $T_r$, may be directly measured and isolated from external vibrations applied to the motor 10.

$$F'_m = F_m - F_x \cos\theta - F_y \sin\theta \qquad (1)$$

According to another embodiment of the invention, a pair of sensors 40 mounted to a non-rotational portion of the motor 10 may be used to isolate sources of vibration in the motor 10. With reference again to FIG. 5, each sensor 40 generates three vibration signals, where each signal corresponds to vibration in a different axis. The sensor 40 at the first position 41 generates a signal along each of an X axis 112, a Y axis 114, and a Z axis 110. The signals along each axis have a positive magnitude as shown by the respective vectors, $X_1$, $Y_1$, and $Z_1$. Similarly, the sensor 40 at the second position 42 generates a signal along each of an X axis 122, a Y axis 124, and a Z axis 120. The signals along each axis have a positive magnitude as shown by the respective vectors, $X_2$, $Y_2$, and $Z_2$. Each of the vibration signals is transmitted either to the controller 80 or to the processor 64 of the motor controller 50. For convenience, the discussion below will refer to the signal being transmitted to and further processing performed by the controller 80. However, it is understood that the signal could similarly be transmitted to and further processing performed by the motor controller 50.

The controller 80 utilizes signals from both the sensor 40 at the first position 41 and the sensor 40 at the second position 42 along at least one of the axes, X, Y, or Z, to isolate different vibrations. Using signals from both sensors 40 helps cancel electrical noise that may be generated within the motor 10 and/or by the motor controller 50 and received by the sensors 40 and/or transmitted along the electrical conductors carrying the vibration signals. Table 1, presented below, identifies which vibration is isolated as a function of the vibration signals from each axis.

TABLE 1

Vibration isolation as a function of vibration signals detected

| Vibration Isolated | Axes Utilized |
| --- | --- |
| Rotational vibration | $f_{Ro}$ ($X_1$, $X_2$) |
| Radial unidirectional vibration | $f_{Ra}$ ($X_1$, $X_2$, $Y_1$, $Y_2$) |
| Axial directional vibration | $f_{Ax}$ ($Z_1$, $Z_2$) |
| Mechanical resonance | $f_{MR}$ ($X_1$, $X_2$, $Y_1$, $Y_2$, $Z_1$, $Z_2$, Δt) |
| Motor inclination | $f_{In}$ ($X_1$, $X_2$, $Y_1$, $Y_2$, $Z_1$, $Z_2$) |

The controller 80 is further configured to adjust operation of the motor 10 as a function of the vibration detected. The controller 80 samples the vibration signals at a sampling frequency greater than the expected frequency of vibration being isolated. The frequency of vibration may be, for example, between 100 and 2000 Hertz. Consequently, the sampling frequency would be at least 4000 Hertz. Optionally, the controller 80 may be configured to sample in the tens of kilohertz. Initial processing of the vibration signals may be performed by the logic circuit 82, for example, to combine the signals in one of the axes from each sensor 40, and the processor 84 in the controller 80 may subsequently sample the combined signal. The controller 80 stores a predefined number of the sampled values in the memory device 86 for subsequent processing. For example, the controller 80 may execute a fast fourier transform (FFT) routine on the stored values to identify the magnitude of different frequencies present in the vibration signals. Individual frequencies that are substantially greater than other frequencies (e.g., two times, ten times, or greater) may indicate the presence of a vibration at the frequency. The controller 80 then adjusts the operation of the motor 10 as a function of the vibration detected. The controller 80, for example, may command a different operating speed of the motor 10. Optionally, the controller 80 may have a set of parameters for the motor controller 50 stored in the memory device. The controller 80 may execute a tuning routine to adjust one or more of the parameters and transmit the new value of the parameter to the motor controller 50. The controller 80 continues sampling the vibration signals to determine whether the new value for the parameter has increased or decreased the magnitude of vibration at the identified frequency. The controller 80 continues executing the tuning routine until the minimum value for the identified frequency is achieved, until a predefined reduction in the value is achieved, or until some other predefined metric for improving operation of the motor 10 is achieved.

It is further contemplated that the controller 80 executes different tuning routines for each type of vibration identified. For example, the controller 80 may include a first tuning routine to reduce the magnitude of rotational vibration and a second tuning routine to reduce the magnitude of radial vibration. Each tuning routine may be configured to adjust one or more parameters within the motor controller 50. The parameters may be, for example, controller gains for a regulator or regulators controlling one or more of the following: current, voltage, speed, acceleration, torque, or position of the motor 10.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An electric machine configured to be operated by a controller, the electric machine comprising:
a housing;
a stator mounted within the housing and configured to receive a voltage from the controller to control operation of the electric machine;
a rotor rotatably mounted within the housing, wherein the rotor rotates as a function of the voltage applied to the stator;
a shaft connected to the rotor and extending outside the housing, the shaft having a central axis about which it rotates;
a first sensor mounted at a first position proximate to the shaft and configured to generate a signal corresponding to a vibration detected at the first position; and
a second sensor mounted at a second position proximate to the shaft and configured to generate a signal corresponding to a vibration detected at the second position, wherein:
the first position and the second position are located in a plane orthogonal to the central axis of the shaft,
the signals corresponding to the vibration detected at the first and second positions are transmitted to the controller,
the controller adjusts operation of the voltage provided to the stator as a function of the signals corresponding to the vibration detected at the first and second positions to reduce a magnitude of the vibration,
the vibration detected at the first position by the first sensor is in a first axis,
the first axis is oriented either tangentially to a rotation of the shaft or parallel to the central axis of the shaft,
the vibration detected at the second position by the second sensor is in a second axis, and
the second axis is located on an opposite side of the shaft and is oriented either tangentially to a rotation of the shaft or parallel to the central axis of the shaft.

2. The electric machine of claim 1 wherein the signal generated by the first sensor has a first polarity and the signal generated by the second sensor has a second polarity, wherein the first polarity is opposite the second polarity.

3. The electric machine of claim 1 wherein:
the first sensor measures vibration in a first set of axes and generates a plurality of first vibration signals, each first vibration signal corresponds to a magnitude of vibration detected at the first position and measured in one axis of the first set of axes, wherein each of the first vibration signals corresponds to a vibration measured in a different axis than the other first vibration signals,
the second sensor measures vibration in a second set of axes and generates a plurality of second vibration signals, each second vibration signal corresponds to a magnitude of vibration detected at the second position and measured in one axis of the second set of axes, wherein each of the second vibration signals corresponds to a vibration measured in a different axis than the other second vibration signals, and
each axis of the first vibration signals corresponds to one axis of the second vibration signals.

4. The electric machine of claim 3 wherein each of the plurality of first vibration signals has a first polarity and each of the plurality of second vibration signals has a second polarity, wherein the first polarity of each of the first vibration signals is opposite the second polarity of the corresponding second vibration signal.

5. The electric machine of claim 1 further comprising:
a third sensor mounted at a third position proximate to the shaft and configured to generate a signal corresponding to a vibration detected at the third position; and
a fourth sensor mounted at a fourth position proximate to the shaft and configured to generate a signal corresponding to a vibration detected at the fourth position, wherein the third position and the fourth position are located in a plane orthogonal to the central axis of the shaft, the signals corresponding to the vibration detected at the third and fourth positions are transmitted to the controller, and the controller further adjusts the voltage provided to the stator of the electric machine as a function of the signals corresponding to the vibration detected at the third and fourth positions.

6. The electric machine of claim 1 wherein the first position is located on the shaft and the second position is a fixed mounting point.

7. An electric machine configured to be operated by a controller, the electric machine comprising:
a housing;
a stator mounted within the housing and configured to receive a voltage from the controller to control operation of the electric machine;
a rotor rotatably mounted within the housing, wherein the rotor rotates about a central axis as a function of the voltage applied to the stator;
at least two sensors, each sensor mounted at a position proximate to the rotor and each sensor configured to generate a signal corresponding to a vibration detected at the position the sensor is mounted, wherein:
each position is located in a plane orthogonal to the central axis,
each signal is transmitted to the controller,
the controller identifies a first vibration and a second vibration as a function of the signals corresponding to the vibration detected, wherein the first vibration identified is a different vibration than the second vibration identified and each of the first and second vibrations are selected from one of a rotational vibration, a radial unidirectional vibration, an axial directional vibration, a mechanical resonance, and a motor inclination, and
the voltage received at the stator from the controller is varied as a function of the type of vibration identified to reduce the identified vibration.

8. The electric machine of claim 7 further comprising a shaft coupled to the rotor wherein one of the at least one sensors is mounted to the shaft.

9. The electric machine of claim 8 wherein one of the at least one sensors is mounted at a fixed location within the housing proximate to the shaft.

10. The electric machine of claim 7 wherein:
the at least two sensors includes a first sensor mounted at a first position,
the vibration detected at the first position by the first sensor is in a first axis,
the first axis is oriented either tangentially to a rotation of a shaft connected to the rotor or parallel to the central axis of the shaft,
the at least two sensors include a second sensor mounted at a second position,
the vibration detected at the second position by the second sensor is in a second axis, and
the second axis is oriented either tangentially to a rotation of the shaft or parallel to the central axis of the shaft.

11. The electric machine of claim 10 further comprising at least one bearing set configured to rotatably mount the rotor within the housing wherein the first position and the second position are selected proximate to the bearing set.

12. The electric machine of claim 10 wherein:
the first sensor measures vibration in a first set of axes and generates a plurality of first vibration signals, each first vibration signal corresponds to a magnitude of vibration detected at the first position and measured in one axis of the first set of axes, wherein each of the first vibration signals corresponds to a vibration measured in a different axis than the other first vibration signals,
the second sensor measures vibration in a second set of axes and generates a plurality of second vibration signals, each second vibration signal corresponds to a magnitude of vibration detected at the second position and measured in one axis of the second, set of axes, wherein each of the second vibration signals corresponds to a vibration measured in a different axis than the other second vibration signals, and
each axis of the first vibration signals corresponds to one axis of the second vibration signals.

13. The electric machine of claim 10 wherein the at least two sensors further includes a third sensor mounted at a third position and a fourth sensor mounted at a fourth position, wherein the third position and the fourth position are located in a plane orthogonal to the central axis of the shaft, each signal generated from the third and fourth sensor is transmitted to the controller, and the controller further adjusts the voltage received at the stator from the controller as a function of the signals corresponding to the vibration detected at the third and fourth positions.

14. A method of controlling operation of an electric machine, the method comprising the steps of:
generating a voltage with a controller, wherein the voltage is provided to a stator of the electric machine, which, in turn, causes rotation of a rotor of the electric machine;
generating a signal responsive to a vibration along a first axis present at a first position within the electric machine with a first sensor mounted at the first position wherein the signal generated by the first sensor has a positive magnitude and a negative magnitude and wherein the first axis is oriented either tangentially to a rotation of a shaft connected to the rotor or parallel to the central axis of the shaft;
transmitting the signal corresponding to the vibration present at the first position from the first sensor to the controller;
generating a signal responsive to a vibration along a second axis present at a second position within the electric machine with a second sensor mounted at the second position wherein:
the signal generated by the second sensor has a positive magnitude and a negative magnitude,
the positive magnitude of the first sensor is in the same direction as the negative magnitude of the second sensor,
the first position and the second position are located in a plane orthogonal to a shaft of the electric machine, and
the second axis is oriented either tangentially to a rotation of the shaft or parallel to the central axis of the shaft;
transmitting the signal corresponding to the vibration present at the second position from the second sensor to the controller; and
adjusting the voltage provided to the stator with the controller as a function of the signals corresponding to the vibration present at the first and second positions to reduce a magnitude of the vibration.

15. The method of claim 14 wherein:
the first sensor measures vibration in a first set of axes and generates a plurality of first vibration signals, each first vibration signal corresponds to a magnitude of vibration detected at the first position and measured in one axis of the first set of axes, wherein each of the first vibration signals corresponds to a vibration measured in a different axis than the other first vibration signals,
the second sensor measures vibration in a second set of axes and generates a plurality of second vibration signals, each second vibration signal corresponds to a magnitude of vibration detected at the second position and measured in one axis of the second set of axes, wherein each of the second vibration signals corresponds to a vibration measured in a different axis than the other second vibration signals, and each axis of the first vibration signals corresponds to one axis of the second vibration signals.

16. The method of claim 15 wherein each of the plurality of first vibration signals has a first polarity and each of the plurality of second vibration signals has a second polarity wherein the first polarity of each of the first vibration signals is opposite the second polarity of the corresponding second vibration signal.

17. The method of claim 14 further comprising the steps of:

detecting a vibration present at a third position within the electric machine with a third sensor mounted at the third position;

transmitting a signal corresponding to the vibration present at the third position from the third sensor to the controller;

detecting a vibration present at a fourth position within the electric machine with a fourth sensor mounted at the fourth position, wherein the third position and the fourth position are located in a plane orthogonal to the shaft of the electric machine; and transmitting a signal corresponding to the vibration present at the fourth position from the fourth sensor to the controller, wherein the controller further adjusts the voltage provided to the stator as a function of the signals corresponding to the vibration detected at the third and fourth positions.

* * * * *

UNITED STATES PATENT AND TRADEMARK OFFICE
CERTIFICATE OF CORRECTION

PATENT NO. : 9,673,685 B2  
APPLICATION NO. : 14/243353  
DATED : June 6, 2017  
INVENTOR(S) : Cooper et al.

Page 1 of 1

It is certified that error appears in the above-identified patent and that said Letters Patent is hereby corrected as shown below:

In the Claims

Claim 12, Column 12, Line 3, Replace "second," with "second".

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*